Sept. 5, 1950      H. W DIETERT ET AL      2,521,206
APPARATUS FOR TESTING SPECIMENS OF MOLDING MATERIAL Filed July 30, 1945      2 Sheets-Sheet 1

*INVENTORS*
HARRY W.DIETERT
BY ROBERT L.DOELMAN

ATTORNEYS

Sept. 5, 1950  H. W DIETERT ET AL  2,521,206
APPARATUS FOR TESTING SPECIMENS OF MOLDING MATERIAL
Filed July 30, 1945  2 Sheets-Sheet 2

*INVENTORS*
HARRY W. DIETERT
BY ROBERT L. DOELMAN
*Whittemore, Hulbert & Belknap*
ATTORNEYS Patented Sept. 5, 1950

2,521,206

UNITED STATES PATENT OFFICE 2,521,206

APPARATUS FOR TESTING SPECIMENS OF MOLDING MATERIAL

Harry W. Dietert and Robert L. Doelman, Detroit, Mich., assignors, by direct and mesne assignments, to Harry W. Dietert Company Application July 30, 1945, Serial No. 607,844

2 Claims. (Cl. 73—15.6)

The invention relates to the testing of molding materials to determine various characteristics of the same such, for instance, as hot strength, hot expansion, hot deformation and hot permeability at temperatures equal to the pouring temperature of the molten metal. Heretofore specimens of such materials have been tested in small furnaces in which they are heated to a temperature corresponding to that attained in the mold when in contact with the molten metal. There is, however, one condition existing in the actual mold which is not reproduced in the test machine, viz., the character of the atmosphere which fills the interstices of the material. In the mold certain gases and vapors are generated by the heating of the material which create the surrounding atmosphere. In the testing apparatus as heretofore constructed, such generated gases are free to escape so that the atmosphere surrounding the specimen differs from that existing in the mold.

It is the object of the invention to perform the tests under conditions which reproduce as near as possible those existing in the actual mold.

It is a further object to provide for varying these conditions to determine alteration in properties of the material resulting therefrom.

It is a further object to obtain about the specimen during the testing of the same an atmosphere of its own generated gases. With these objects in view the invention consists in the apparatus as hereinafter set forth.

Figure 1:
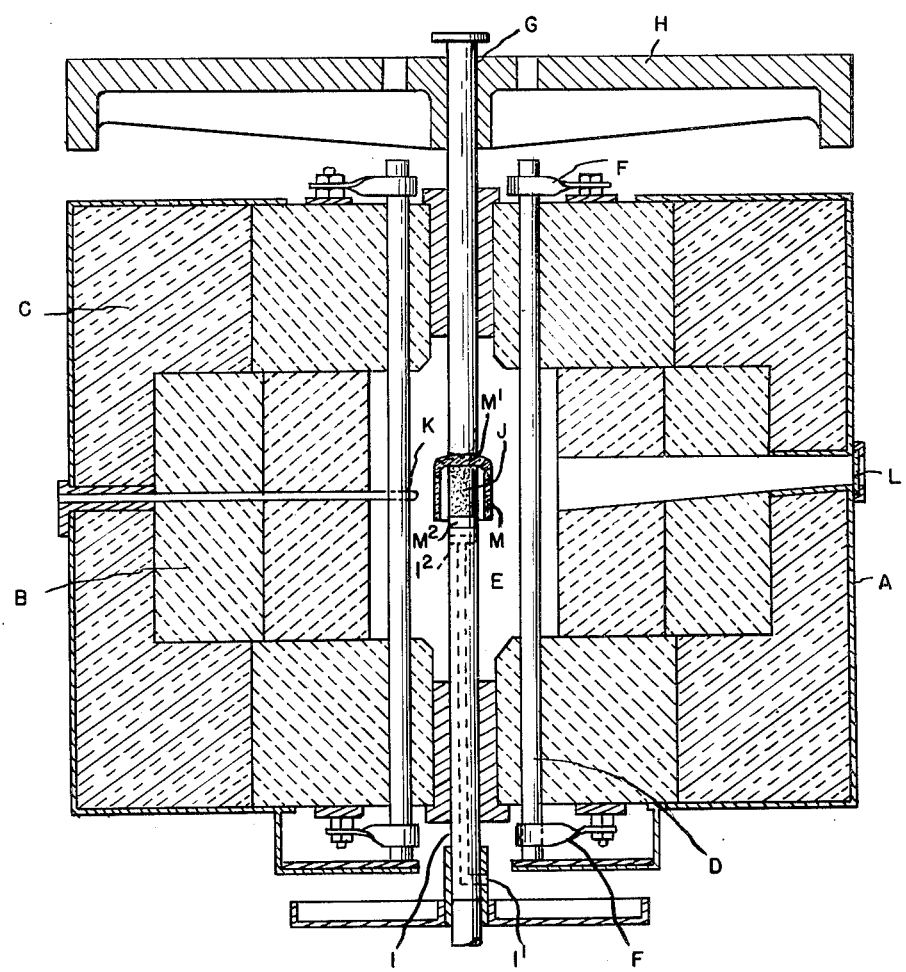
Fig. 1 is a vertical central section through a test furnace modified to carry out our improved method.

The general construction of the testing furnace is not the subject matter of the instant invention but, as shown in Fig. 1, A is a casing enclosing a refractory lining B and thermal insulating material C. The heat is generated by an annular series of electrical resistors D passing through the chamber E and having at their upper and lower ends suitable electrical connections F. A refractory rod G extends downward centrally into the chamber E being anchored at its upper end to a suitable frame member H. A second refractory rod I is insertable into the chamber E through the lower end thereof and carries at its upper end the specimen J to be tested. Thus, the physical characteristics of the specimen may be tested by its reaction on the rods G and I, while under heat generated by the resistors D. A thermocouple K extends into the chamber E to register the temperature thereof and a peep hole L is arranged for inspection of the specimen while under test.

Figure 2:
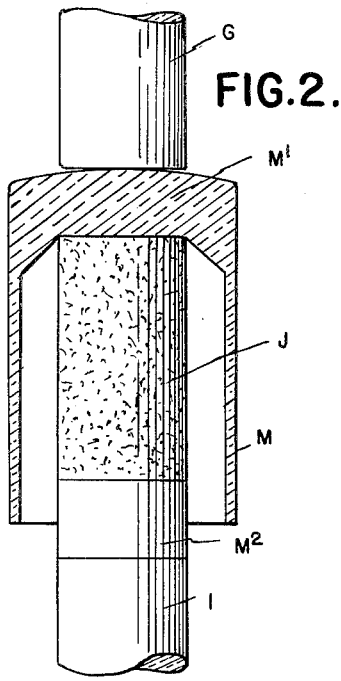
Fig. 2 is an enlarged section showing one form of hood or enclosure for surrounding the specimen while under test.

With the construction as thus described, the volume of the chamber E being relatively large in relation to that of the specimen, any gases generated in the latter are free to escape and will be diluted by the air in the chamber. This condition is very different from that in a mold where the only escape for the generated gases is through the interstices of the material. To more nearly reproduce the actual condition in the mold, means is provided for maintaining the specimen in an atmosphere of its own generated gases during the performance of the tests. This is preferably accomplished by providing a hood M for surrounding the specimen, said hood being open at its bottom and closed at its top. The hood may be made of various materials but, as shown in Fig. 2, is formed of ceramic material having its head portion M' of sufficient strength for the transmission of mechanical stresses therethrough from the rod G. It is also preferably dome-shaped to give greater strength. The side walls may be comparatively thin to form less resistance to the conduction of heat therethrough. The specimen J when placed within this hood will have its upper end bearing directly against the head M', while its lower end will bear against a disc $M^2$ supported on the rod I. Thus, when under the test, the gas generated within the specimen will completely fill the chamber within the hood escaping through the open lower end thereof.

Figure 3:
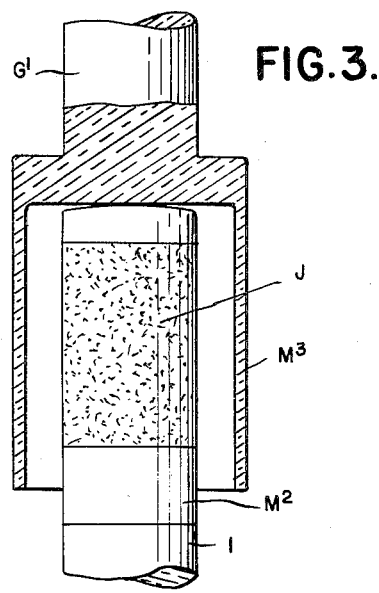
Figs. 3, 4 and 5 are similar views showing modified constructions.

In the modified construction shown in Fig. 3, the hood $M^3$ is formed integral with the upper rod G' remaining constantly within the furnace, the specimen being inserted therein when raised by the rod I.

Figure 4:
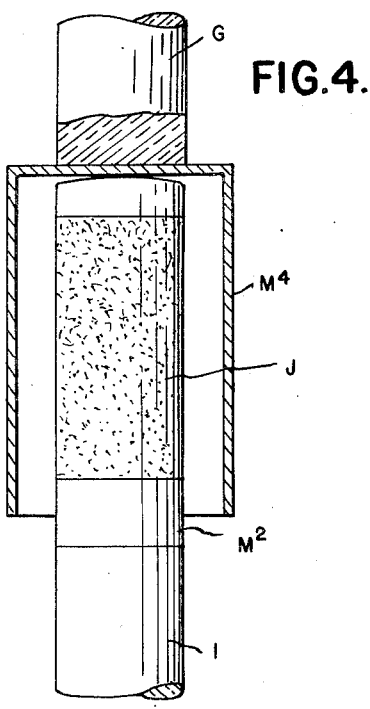

In Fig. 4 another modification is shown where the hood $M^4$ is made of some high fusing metal, such as platinum.

Figure 5:
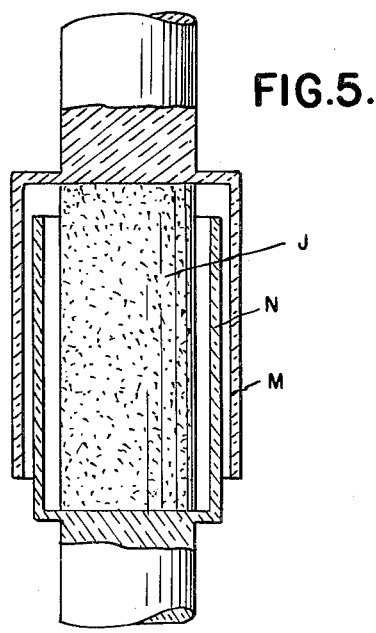

In the modification shown in Fig. 5, an inverted hood N surrounds the specimen and telescopically engages the hood M. However, there will be little tendency for exchange of atmosphere through the open lower end of the tube so that the telescoping casing is not essential.

It may be desirable to conduct tests where the specimen is surrounded by other gases than those generated within itself. For this purpose the rod I is formed hollow having ports I' and I² respectively without the casing A and within the chamber E. This passage will equalize the pressure within the chamber E to that of the external atmosphere and, if desired, may be also used for introducing into the chamber E any other gas.

What we claim as our invention is:

1. In an apparatus for mechanically testing specimens of molding materials while under heat, the combination with opposed members for applying pressure to a specimen therebetween, of an inverted cup enclosure between said members for said specimen for maintaining the latter in an atmosphere of its own generated gases.

2. In an apparatus for mechanically testing specimens of molding materials while under heat, the combination with a heating furnace having a chamber therein, and members extending oppositely into said chamber between which the specimen is adapted to be placed, of an inverted cup between said opposed members forming an enclosure for the specimen while subjected to the mechanical pressure of said members adapted to maintain around the specimen an atmosphere of its own generated gases.

HARRY W. DIETERT.
ROBERT L. DOELMAN.

REFERENCES CITED

The following references are of record in the file of this patent:

UNITED STATES PATENTS

| Number | Name | Date |
|---|---|---|
| 1,988,597 | Karrer | Jan. 22, 1935 |
| 2,245,269 | Gilbert | June 10, 1941 |
| 2,336,286 | Owen | Dec. 7, 1943 |
| 2,377,590 | Talalay | June 5, 1945 |